United States Patent
Morimoto et al.

(10) Patent No.: US 6,453,124 B2
(45) Date of Patent: Sep. 17, 2002

(54) DIGITAL CAMERA

(75) Inventors: Yasuhiro Morimoto, Takatsuki; Takeru Butsuzaki, Sakai; Kazuhiko Yukawa, deceased, late of Sakai, by Kazumi Yukawa, legal representative; Hiroaki Kubo, Muko, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/815,977

(22) Filed: Mar. 22, 2001

(30) Foreign Application Priority Data

Mar. 27, 2000 (JP) ........................................ 2000-086391
Mar. 30, 2000 (JP) ........................................ 2000-093334

(51) Int. Cl.$^7$ ............................................. G03B 13/36
(52) U.S. Cl. ........................ 396/91; 396/100; 396/111; 396/148; 396/125; 348/346; 348/349; 348/347; 348/362
(58) Field of Search ................................ 396/374, 148, 396/80, 91, 100, 125, 104, 111, 213, 429; 348/346, 347, 349–356, 362–366, 345

(56) References Cited

U.S. PATENT DOCUMENTS 4,949,117 A  *  8/1990  Van Heyningen et al. .. 396/100
5,597,999 A      1/1997  Kinba et al. ............. 250/201.7
5,815,748 A  *  9/1998  Hamamura et al. ......... 396/104
6,037,972 A  *  3/2000  Horiuchi et al. ........ 348/364 X

FOREIGN PATENT DOCUMENTS

JP         09-181954 A        7/1997

\* cited by examiner

*Primary Examiner*—W. B. Perkey
(74) *Attorney, Agent, or Firm*—Sidley Austin Brown & Wood LLP

(57) ABSTRACT

At power-on, a digital camera starts to operate with a display unit off (state S1). At a subsequent half shutter press of a shutter button, a quick return mirror is flipped down and phase difference AF is performed with live view display off (state S3). At a subsequent full press of the shutter button, the digital camera enters an image capture operation. With a quick return mirror in the up position, a focusing lens is moved to its in-focus, front focus and rear focus positions, at each of which contrast in an AF area of predetermined partial portion of an image is obtained for comparison to select a position of the focusing lens with maximum contrast (state S4). Then, image data is obtained and recorded on a memory card (state S5). With the above processing, the digital camera can perform autofocusing, as circumstances demand, by a contrast AF method.

16 Claims, 7 Drawing Sheets

F I G. 6
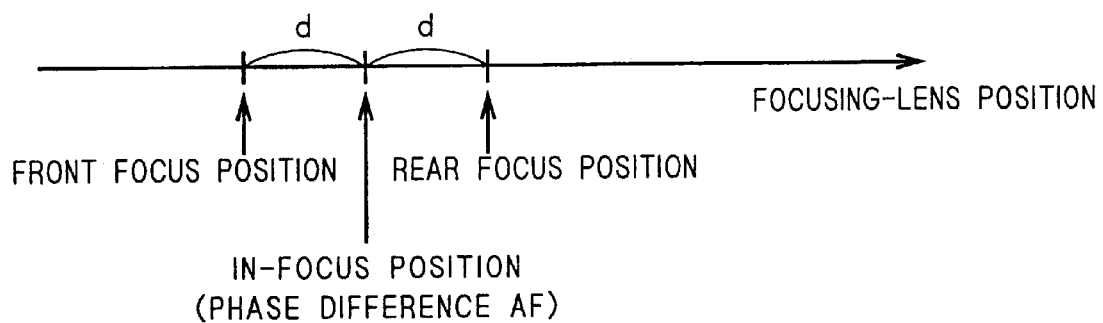

DIGITAL CAMERA

This application is based on the applications Nos. 2000-86391 and 2000-93334 filed in Japan, the contents of which are hereby incorporated by reference.

BACKGROUND OF THE INVENTION

1. Field of the Invention

The present invention relates to a digital camera for capturing a subject image to generate image data, and especially to an autofocus (hereinafter referred to as "AF") technique used in a digital camera.

2. Description of the Background Art

Most of single lens reflex digital cameras are configured such that an image sensor such as a CCD is installed in a film loading part of a single lens reflex camera utilizing silver halide films (hereinafter referred to as a "silver-halide-film camera"). Such digital cameras achieve focus by a phase difference autofocus (AF) method in which focusing is obtained by separating light passing through a taking lens by a separator lens and obtaining the amount of lens travel on the basis of a distance between images.

The recent trend to increase the number of pixels with reduced pixel pitch in an image sensor requires improved focus accuracy. In the phase difference AF method, however, there are limitations to the focus accuracy, and therefore it is getting difficult to perform autofocusing with focus accuracy appropriate to the pixel pitch.

Besides the phase difference AF method, AF techniques include image-signal autofocus that attains focus on the basis of contrast of image data obtained in an image sensor: more specifically, a contrast AF method for achieving focus based on image contrast. The contrast AF method attains higher focus accuracy than the phase difference AF method. Thus, it is desired that a digital camera should adopt the contrast AF method depending on an increased number of pixels in the image sensor. However, as above described, contrast AF cannot be used in a single lens reflex digital camera.

Now, if a digital camera is configured with a CCD image sensor which includes a plurality of pixels more densely packed than before, a permissible circle of confusion becomes smaller than before and a higher degree of focus-position detection accuracy is required in autofocusing.

Conventionally, a technique, called a "contrast AF method" (or "hill-climbing AF method") is adopted for autofocusing in image capture devices such as video cameras. This contrast AF method is more specifically a technique which is used while driving a focusing lens included in a taking lens, and is for obtaining as evaluation values the contrast of captured images at each drive step and selecting a lens position with the maximum evaluation value as an in-focus position. Hereinafter, the terminology "in-focus position" refers to a position at which a lens is positioned to provide an in-focus image.

In the field of video cameras and the like for motion image capture, since the number of pixels in the CCD image sensor to be used is approximately several hundreds of thousands, a permissible circle of confusion is large and improved accuracy is not required in autofocusing. Further, an excessively high focus speed in video recording causes frequent changes of a focused portion of an image in response to movements of the camera and the subject and thereby unnatural images are produced because the human eye cannot follow such frequency. From this, required features of video cameras for autofocusing differ from those of still cameras.

Digital cameras for still image capture, on the other hand, are required to immediately achieve focus in order not to lose a shutter release opportunity.

Besides, the phase difference AF method is conventionally adopted for autofocusing in single lens reflex cameras for silver halide films. In autofocusing by the phase difference AF method, the extent to which an in-focus position of a lens is offset from a film plane can be recognized instantaneously by the distance (phase difference) between images at the time when a phase difference detection sensor with a CCD line sensor receives light from a subject image. From this, the phase difference AF method is advantageous in that only one lens drive brings the in-focus position into coincidence with the film plane.

On the other hand, in autofocusing by the contrast AF method especially when the contrast of a captured image is low, a change in the evaluation values before and after a taking lens drive may be so small that in which direction the lens should be moved to its in-focus position cannot be determined. The contrast AF method therefore has a problem of taking much time to achieve an in-focus condition.

Even in autofocusing by the phase difference AF method, it is necessary to improve the resolution of the CCD line sensor to achieve an in-focus condition with high accuracy. This increases the size and cost of the phase difference detection sensor for detecting the phase difference. Moreover, the phase difference AF method may have an error in the in-focus position because of an error in installation of the phase difference detection sensor.

SUMMARY OF THE INVENTION

The present invention is directed to a digital camera.

According to an aspect of the present invention, the digital camera comprises an image sensor for capturing a subject image; a mirror movable between a first position to enter an optical path from an imaging optical system to the image sensor, and a second position to withdraw from the optical path; a driver for driving the mirror; a first detector for detecting an in-focus condition of the imaging optical system on the basis of an image signal from the image sensor; a display for displaying an image signal obtained by the image sensor; and a focus controller for when the display provides a display, controlling the driver to move the mirror to the second position and driving the imaging optical system according to a result of detection by the first detector.

Thus, when the display provides a display, autofocusing based on the image signal from the image sensor can be performed. Such autofocusing for the live view display provides precise framing.

According to another aspect of the present invention, the digital camera comprises: an image sensor for capturing a subject image; a mirror movable between a first position to enter an optical path from an imaging optical system to the image sensor, and a second position to withdraw from the optical path; a driver for driving the mirror; a first detector for detecting an in-focus condition of the imaging optical system on the basis of an image signal from the image sensor; a second detector for detecting an in-focus condition of the imaging optical system by a phase difference method; a selector for selecting either the first detector or the second detector; and a driver controller for when the selector selects the first detector to detect an in-focus condition, controlling the driver to move the mirror to the second position and when the selector selects the second detector to detect an in-focus condition, placing the mirror at the first position.

The selection from the first and second detectors allows switching between the live view display and the optical viewfinder. Thereby autofocusing can be performed even for framing by the optical viewfinder.

According to still another aspect of the present invention, the digital camera comprises: an image sensor for capturing a subject image; a mirror movable between a first position to enter an optical path from an imaging optical system to the image sensor, and a second position to withdraw from the optical path; a driver for driving the mirror; a first detector for detecting an in-focus condition of the imaging optical system on the basis of an image signal from the image sensor; a second detector for detecting an in-focus condition of the imaging optical system by a phase difference method; an operating member for image capture being movable from a first operating position to a second operating position which is a further pressed position from the first operating position; and a focus controller for when the operating member for image capture is at the first operating position, placing the mirror at the firs[009f] position and driving the imaging optical system according to a result of detection by the second detector and when the operating member for image capture is at the second operating position, controlling the driver to move the mirror to the second position and driving the imaging optical system according to a result of detection by the first detector.

By driving the imaging optical system according to the result of detection by the second detector, a rough in-focus condition is achieved. Subsequently by driving the imaging optical system according to the result of detection by the first detector with the operating member for image capture at the second operating position, a more precise in-focus condition can be achieved with efficiency.

According to still another aspect of the present invention, the digital camera comprises: an image sensor for capturing a subject image; a mirror movable between a first position to enter an optical path from an imaging optical system to the image sensor, and a second position to withdraw from the optical path; a driver for driving the mirror; a first detector for detecting an in-focus condition of the imaging optical system on the basis of an image signal from the image sensor; a second detector for detecting an in-focus condition of the imaging optical system by a phase difference method; and a focus controller for after driving the imaging optical system according to a result of detection by the second detector with the mirror located at the first position, then controlling the driver to move the mirror to the second position and driving the imaging optical system according to a result of detection by the first detector.

By driving the imaging optical system according to the result of detection by the second detector, a rough in-focus condition is achieved. Subsequently by moving the mirror to the second position and driving the imaging optical system according to the result of detection by the first detector, a more precise in-focus condition can be achieved with efficiency.

In this fashion, an object of the present invention is to enable autofocusing responsive to an image signal from an image sensor in a digital camera and to obtain a focus condition of an image formed in the image sensor with great accuracy and efficiency.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is an explanatory diagram for explaining the position of a focusing lens in image capture of three successive frames.

DESCRIPTION OF THE PREFERRED EMBODIMENTS

Hereinafter, preferred embodiments according to the present invention will be set forth in detail with reference to the drawings.

1. First Preferred Embodiment

First, a first preferred embodiment of the present invention will be described.

<1-1. Device Configuration>

Figure 1:
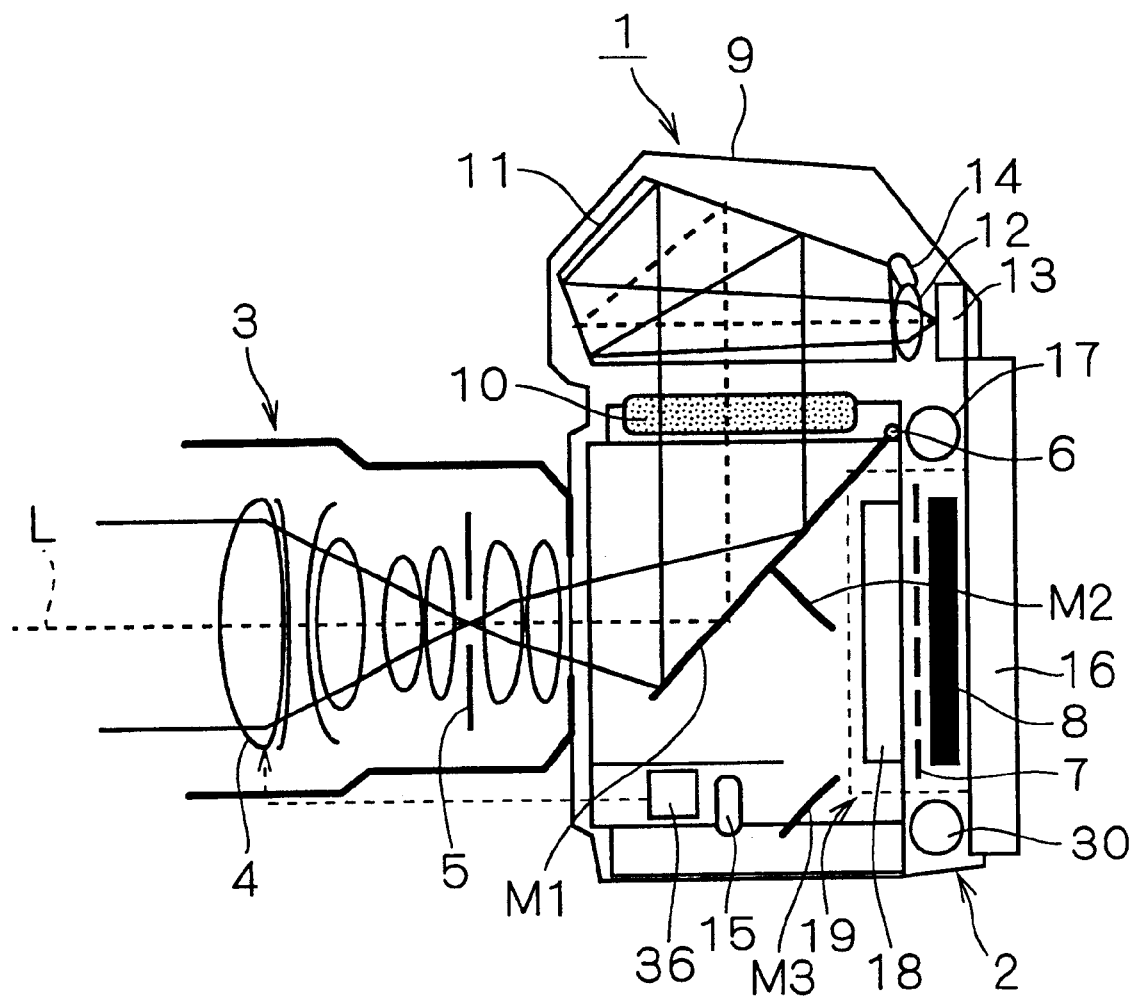
FIG. 1 diagrammatically shows a configuration of a main mechanism of a digital camera according to the present invention.

FIG. 1 diagrammatically shows a configuration of a main mechanism of a digital camera according to a first preferred embodiment of the present invention, and FIGS. 2A to 2D diagrammatically show operating conditions of the main mechanism in image capture.

A digital camera 1 has a camera body 2 which modifies a single lens reflex camera for silver halide films. The camera body 2 has on its front face a taking lens 3 which is equipped with a taking lens portion 4, a diaphragm 5, and the like.

At the rear of the taking lens portion 4 in a direction of the optical path, a quick return mirror M1 is located which is pivotally supported by a pivot 6 in the upper rear portion of the camera body 2 so that it can rotatably be displaced. Further, a focal plane shutter 7 is located at the rear of the quick return mirror M1 in the direction of the optical path and an image sensor 8 at the rear of the focal plane shutter 7.

While the focal plane shutter 7 remains in the camera body 2, it may be removed depending on the type of the image sensor 8.

On the front face of the image sensor 8, an optical low pass filter 18 is provided for excluding the influence of return noise at the sampling of an analog image signal from the image sensor 8. The optical low pass filter 18, the focal plane shutter 7, and the image sensor 8 constitute an imaging unit 19.

The imaging unit 19 is movable back and forth along the optical path by a movement mechanism 30. Responsive to upward rotational movement of the quick return mirror M1 in image capture, the imaging unit 19 moves forward in a direction of the optical axis to its image capture position, i.e., until a light receiving surface of the image sensor 8 is moved to a position of back focal length. After image capture, responsive to downward rotational movement of the quick return mirror M1, the imaging unit 19 moves backward in the direction of the optical axis to its retracted position where no mechanical interference with the quick return mirror M1 occurs.

The movement mechanism 30 can, adopt any mechanism of a known configuration: for example, it can be constituted;

by a mechanism for converting rotation of a motor-driven bolt into axial linear motion.

A finder equivalent part 9, corresponding to a finder of a silver-halide-film camera, is formed above the quick return mirror M1 in the camera body 2. The finder equivalent part 9 is provided with a pentagonal prism 11 with a focusing screen 10 thereunder. Further, a predetermined relay lens 12 is located at the rear of the prism 11 and an eyepiece 13 is located at the rear of the relay lens 12, while a light measuring sensor 14 is located above the relay lens 12. In FIGS. 2A to 2D, the relay lens 12 is not shown. A range from the taking lens 3 to the optical low pass filter 18 in the imaging unit 19 corresponds to an imaging optical system of the invention. Also, the quick return mirror M1, the prism 11, the relay lens 12, and the eyepiece 13 constitute an optical viewfinder.

Figure 2A:
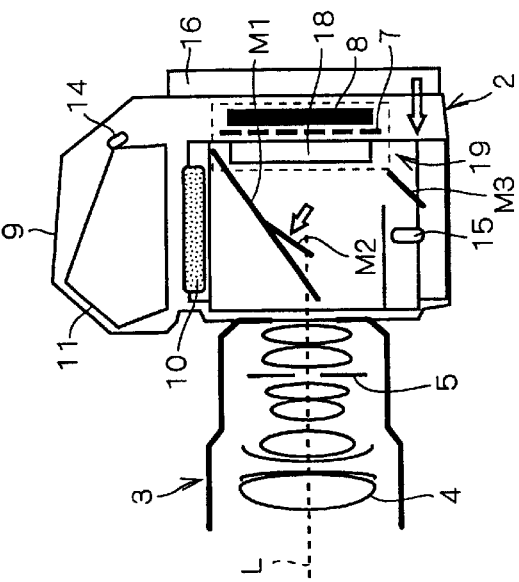
FIGS. 2A to 2D diagrammatically show operating conditions of the main mechanism in image capture.
Figure 2B:
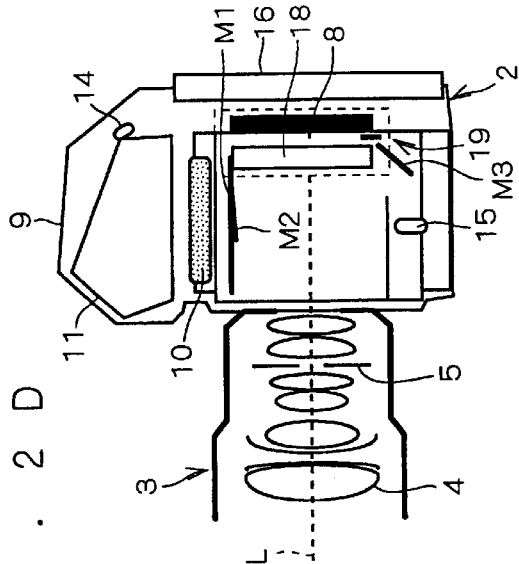
Figure 2C:
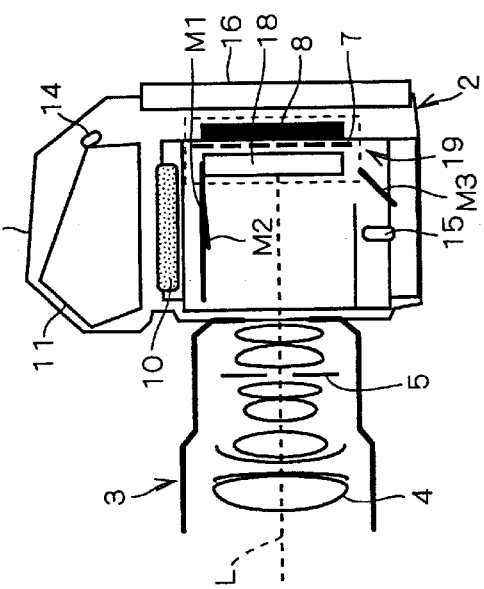
Figure 2D:
Figure 3:
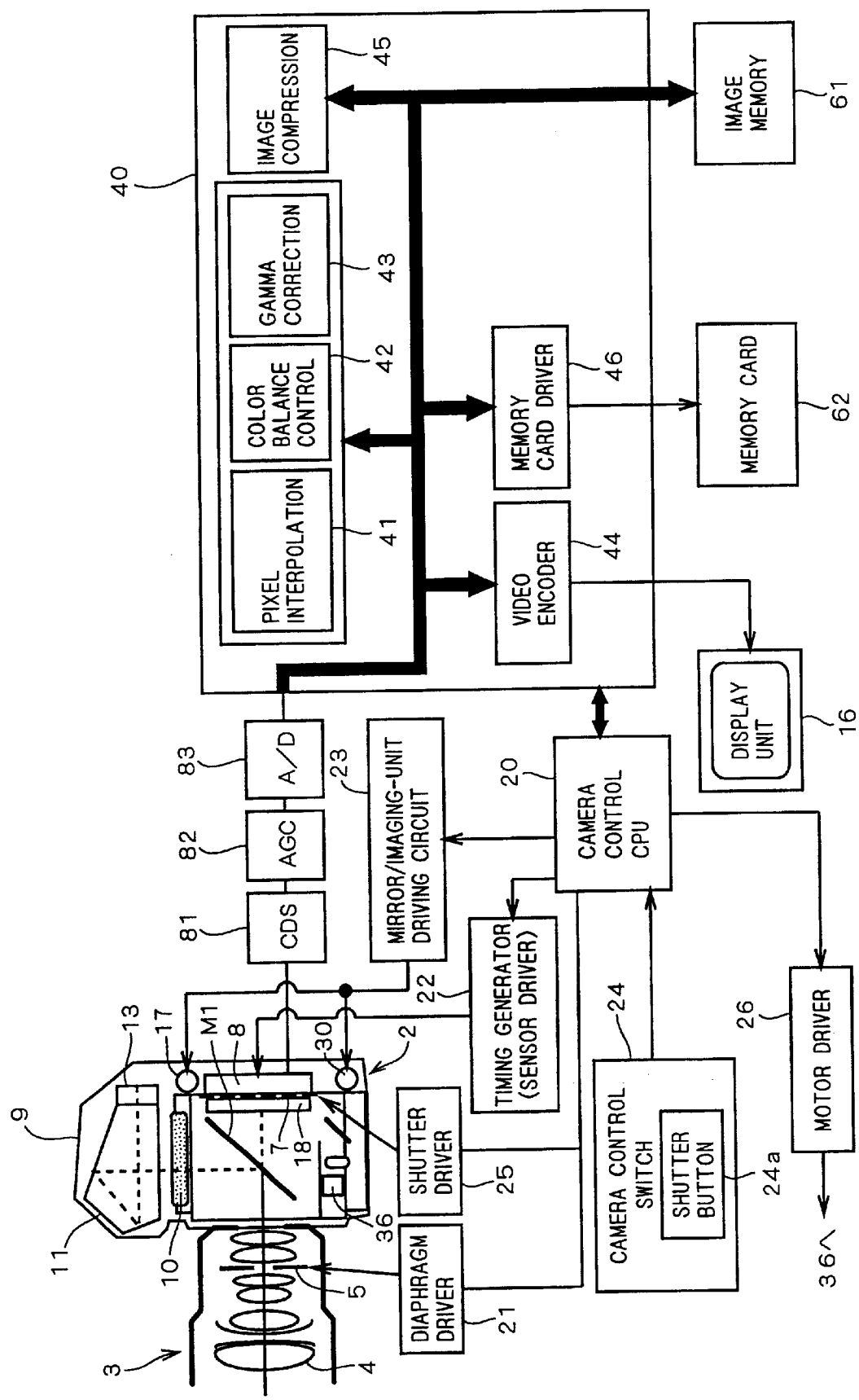
FIG. 3 is a block diagram of a control system in the digital camera.

Until a shutter button 24a shown in FIG. 3 is fully pressed, the quick return mirror M1 is in a stationary position as shown in FIGS. 1 and 2A, i.e., it is inclined 45 degrees to the optical axis, in which case an optical path L from the taking lens portion 4 is toward the focusing screen 10. At a full shutter press of the shutter button 24a (hereinafter also referred to only as a "full shutter press"), the quick return mirror M1 is, as shown in FIGS. 2B to 2D, rotationally displaced about the pivot 6 to almost a horizontal position, to open the optical path L from the taking lens portion 4.

A mirror M2 is a mirror integrated with the quick return mirror M1. This mirror M2 and a fixed mirror M3 thereunder direct an optical image which passes through a half mirror portion partially formed in the quick return mirror M1, toward a distance-measuring sensor 15. Upon receipt of light from the optical image, the distance-measuring sensor 15 detects a distance to the subject and generates a phase difference detection signal. The phase difference detection signal is for use in autofocusing of the taking lens portion 4.

The prism 11 has the function of inverting and scaling down an optical image formed on the focusing screen 10 and directing a resultant image toward the light measuring sensor 14 and the eyepiece 13. Further, control values such as the aperture value and the shutter speed are determined according to light quantity data obtained by the light measuring sensor 14, or by a camera control CPU 20 on the basis of image data from the image sensor 8. Also, the amount of light exposure in the image sensor 8 is determined.

The camera body 2 further comprises a focus motor 36 for driving a focusing lens, included in the taking lens portion 4, in the direction of the optical axis.

On the rear face of the camera body 2 there is provided a display unit 16 constituted by a liquid crystal display (LCD) for displaying images obtained from the output of the image sensor 8.

FIG. 3 is a block diagram of a control system in the digital camera 1.

In FIG. 3, reference numeral 3 designates a taking lens; 4 designates a taking lens portion: 5 designates a diaphragm; M1 designates a quick return mirror; 7 designates a focal plane shutter; 8 designates an image sensor; 11 designates a prism; 13 designates an eyepiece; and 16 designates a display unit, all of which are identical to those shown in FIGS. 1 and 2A to 2D.

Reference numeral 20 designates a camera control CPU which controls each part of the camera body 2. More specifically, the diaphragm 5 is controlled through a diaphragm driver 21 and the image sensor 8 is controlled through a timing generator (sensor driver) 22. An actuator 17 for driving the quick return mirror M1 and the movement mechanism 30 for driving the imaging unit 19 are controlled through a mirror/imaging-unit driving circuit 23, and the focal plane shutter 7 is controlled through a shutter driver 25. The focus motor 36 is controlled through a motor driver 26.

The camera control CPU 20 is connected to a camera control switch 24 which includes the shutter button 24a, a power switch, and the like.

In this preferred embodiment, the image sensor 8 is formed of a charge coupled device (CCD) which is an area sensor with primary-colors filters R (red), G (green), and B (blue) arranged in a checkerboard pattern on a pixel by pixel basis. The image sensor 8 performs photoelectric conversion of a subject's optical image formed by the taking lens portion 4 into an image signal with RGB color components (i.e., a signal consisting of a sequence of image signals from each pixel), and then outputs that image signal.

The timing generator 22 generates and outputs a drive control signal for the image sensor 8 in accordance with a reference clock given from the camera control CPU 20. The timing generator 22, for example, generates clock signals such as a timing signal for starting or stopping the integral (exposure) and a readout control signal (e.g., a horizontal synchronization signal, a vertical synchronization signal, a transfer signal) for readout of signals from each pixel. Those signals are outputted through a driver to the image sensor 8.

Output from the image sensor 8 is subjected to signal processing in a correlated double sampling (CDS) circuit 81, an automatic gain control (AGC) circuit 82, and an A/D converter 83. The CDS circuit 81 reduces noise in an image signal and the AGC circuit 82 provides gain control to adjust the level of the image signal. The A/D converter 83 converts a normalized analog signal from the AGC circuit 82 into a 10-bit digital signal.

Reference numeral 40 designates an image processor for performing image processing on the output from the A/D converter 83 to form an image file. This processor 40 is controlled by an image processing CPU.

In image capture, image data from the image sensor 8 is fetched into the image processor 40 where a variety of processing operations is performed.

The signal fetched from the A/D converter 83 into the image processor 40 is written into image memory 61 in synchronization with readout from the image sensor 8. For subsequent processing, the data in the image memory 61 are accessed and processed in each block.

In the image processor 40, a pixel interpolation block 41 is a block for performing pixel interpolation in a predetermined interpolation pattern. In this preferred embodiment, after pixels R, G, and B are masked in their respective filter patterns, the pixel G with higher frequency component than the pixels R and B is replaced with a means value which is obtained by a median filter using intermediate two values of four pixels surrounding that pixel, while the pixels R and B are subjected to average interpolation to obtain respective outputs.

A color-balance control block 42 corrects the gains of individual outputs for R, G, and B after pixel interpolation in the pixel interpolation block 41, whereby color correction is made to the pixels R, G, and B. With respect to color balance, the camera control CPU 20 performs calculations R/G, B/G for the mean values of the respective outputs for R, G, and B, and resultant values are taken as corrected gains of R and B.

A gamma correction block 43 performs nonlinear conversion of the respective outputs for R, G, and B after normalization of color balance. Thereby a proper contrast transform for the display unit 16 is performed. The gamma-corrected image data are stored in the image memory 61.

A video encoder 44 reads out the above data stored in the image memory 61 and encodes it to an NTSC/PAL format, the result of which is displayed on the display unit 16.

An image compression block 45 performs compression on a captured image from the image sensor 8 by fetching image data from the image memory 61. The compressed captured image is recorded on a memory card 62 through a memory card driver 46.

The memory card 62 is removably loaded in a predetermined part of the camera body 2.

Figure 4:
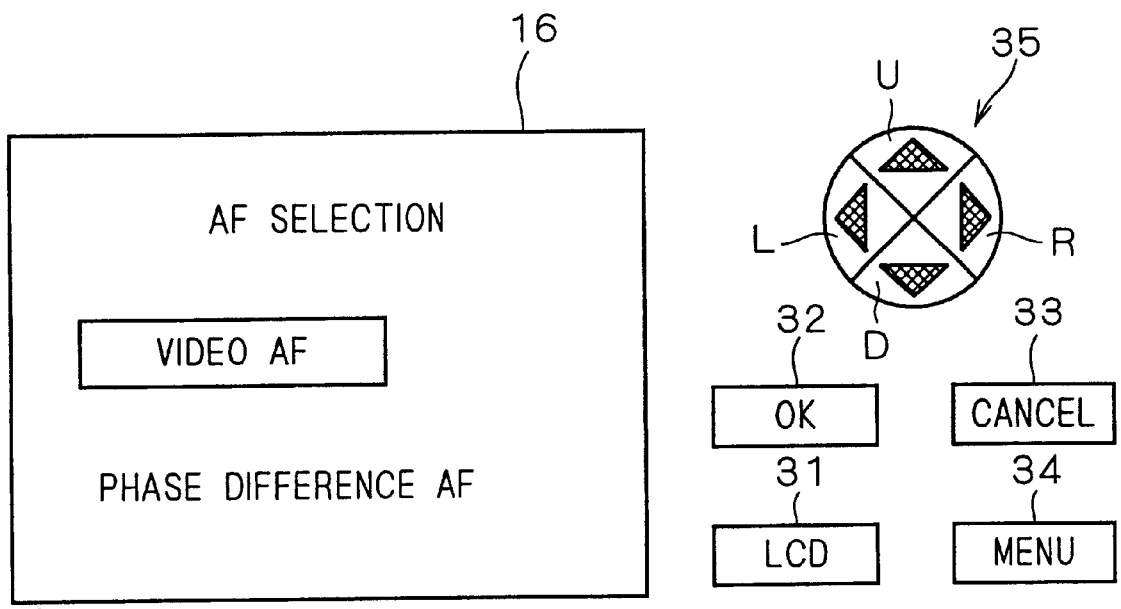
FIG. 4 shows a rear face of the digital camera.

FIG. 4 shows a rear face of the digital camera 1.

On the rear face of the camera body 2, there are provided the aforementioned display unit 16 and a 4-way switch 35 on the right side of the display unit 16. Using U, D, L, and R buttons allows for various operations corresponding to the display on the display unit 16, e.g., a choice from selection items.

Under the 4-way switch 35 on the rear face of the camera body 2, there are further an LCD button 31, an OK button 32, a cancel button 33, and a menu button 34. The LCD button 31 is used for turning on/off a display on the display unit 16. At each push of the LCD button 31, the display unit 16 is switched from on to off, and vice versa. The OK button 32 and the cancel button 33 are used by an operator either to confirm or to cancel a selection of items at various settings. The menu button 34 is used for switching of various setting screens, e.g., a menu selection screen as described later, on the display.

<1-2. State Transitions and Operations>

Now, state transitions and operations of the digital camera 1 will be set forth. The digital camera 1 mainly comes in two operating modes, namely, a "capture" mode and a "playback" mode. The capture mode is a mode of performing processing for image capture, in which mode in a shooting standby state, the display unit 16 displays live view images in some instances as described later and immediately after image capture, the display unit 16 displays a captured image. The playback mode is a mode of performing processing on already-recorded images, e.g., playing back and displaying on the display unit 16 a captured image recorded on the memory card 62.

Switching between the capture and the playback modes is done as follows. By the actuation of the menu button 34 or the like, a mode selection screen is displayed on the display unit 16, on which screen the switching between the capture and the playback modes is effected by the actuation of the 4-way switch 35, the OK button 32, and the cancel button 33.

Figure 5:
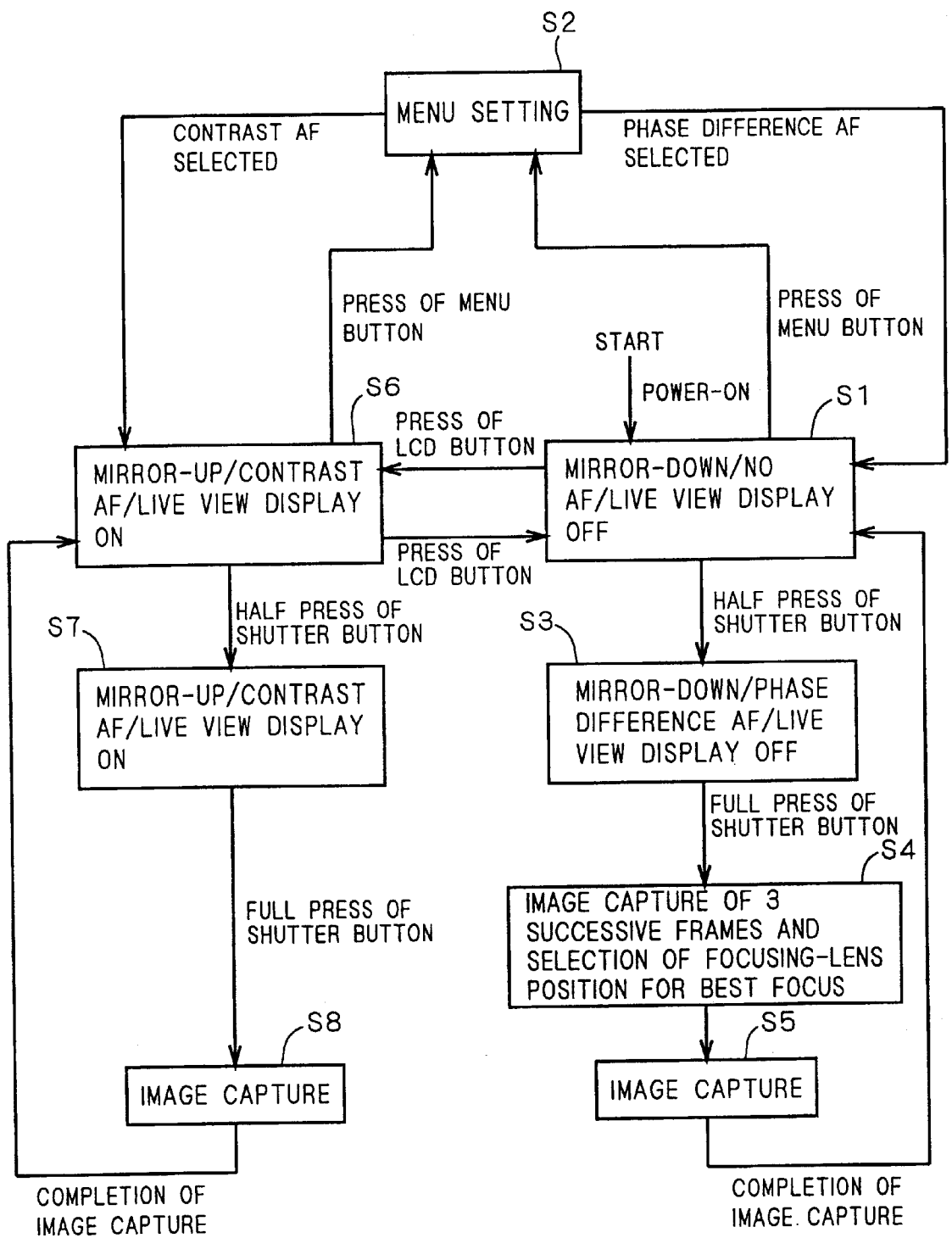
FIG. 5 is a state transition diagram when a digital camera according to a first preferred embodiment is in capture mode.

FIG. 5 is a state transition diagram of the digital camera 1 in the capture mode. Hereinafter, the state transitions in the capture mode will be set forth. Unless otherwise specified, the operation of each unit is controlled by the camera control CPU 20.

At power-on, the digital camera 1 goes into a capture mode with the optical viewfinder, in which mode the digital camera 1 starts to operate with the quick return mirror M1 in the down position as shown in FIG. 2A, the display unit 16 off, and accordingly a live view display described later in the off state (state S1). In this state S1, AF processing is not performed. Thus, a subject image in the optical viewfinder is slightly out of focus; however, rough framing by the optical viewfinder is possible in this state.

In the state S1 and a state S6 which will be described later, a menu setting screen appears on the display with a user's press of the menu button 34, on which screen a user makes menu settings (state S2).

FIG. 4 shows the menu setting screen displayed on the screen of the display unit 16. As shown in FIG. 4, the menu setting screen allows a user to selectively define an AF method to be applied at a half shutter press of the shutter button 24a (hereinafter also referred to only as a "half shutter press"). By pressing either the button U or D of the 4-way switch 35, a selection of the AF method at the half shutter press is made from the contrast AF method and the phase difference AF method.

If the phase difference AF method is selected in the state S2, a transition to the state S1 occurs, while if the contrast AF method is selected in the state S2, a transition to the state S6 occurs. At this time, the transition from the states S2 to S1 turns off the display unit 16 (i.e., live view display), while the transition from the states S2 to S6 holds the display unit 16 in the on state and turns on the live view display.

When the shutter button 24a is pressed halfway down in the state S1, phase difference AF and exposure adjustments are performed with the quick return mirror M1 in the down position and the live view display off (state S3). Hereinafter, the operation in the state S3 will be set forth in detail.

At the half shutter press of the shutter button 24a, as shown in FIG. 2A, the optical path L of light incident from the taking lens portion 4 and the diaphragm 5 changes its direction upward because of the presence of the quick return mirror M1 in the camera body 2. An image is then formed on the focusing screen 10, inverted and scaled down by the pentagonal prism 11, and received, by the light measuring sensor 14. The light measuring sensor 14 measures the amount of light, from which the camera control CPU 20 obtains exposure control data. According to the exposure control data, the diaphragm 5 is controlled through the diaphragm driver 21 and the timing generator 22 for applying the drive control signal to the image sensor 8 is controlled, so that the image sensor 8 receives a proper amount of light exposure.

At this time, the imaging unit 19 is in its retracted position to avoid mechanical interference with the quick return mirror M1, and the image receiving plane of the image sensor 8 is located behind the position of back focal length.

Part of the light incident from the taking lens portion 4 and the diaphragm 5 passes through a half mirror portion in the center of the quick return mirror M1 and travels through the mirror M2 and the fixed mirror M3 toward the distance-measuring sensor 15. Upon receipt of the light, the distance-measuring sensor 15 detects a distance to the subject based on which the focusing lens in the taking lens portion 4 is driven for autofocusing.

Simultaneously with the aforementioned light and distance measuring operations, the optical image, the optical path L of which changed direction at the quick return mirror M1, is scaled down by the prism 11 and the relay lens 12 and then reaches the eyepiece 13. From this, a user can visually recognize a focused subject image through the eyepiece 13. Although not shown, a user can go back to the state S1 for reframing at the release of the half-pressed shutter button 24a during the state S3, which provides precise framing.

If the shutter button 24a is further pressed to its full-pressed position by a user, image capture of three successive frames is performed in a predetermined AF area and a position of the focusing lens is selected which provides the image in sharpest focus out of the three partial images obtained (state S4). Hereinafter, the operation in the state S4 will be set forth in detail.

FIG. 6 is an explanatory diagram for explaining the position of the focusing lens in image capture of three successive frames. For image capture of three successive frames, the image sensor 8 obtains partial image data about only the AF area of central partial rectangular area of an image at different positions of the focusing lens: a position at the time of full shutter press (i.e., an in-focus position determined by the phase difference AF) and positions determined by shifting the above in-focus position both forward and backward by the amount of deviation d obtained from the depth of focus (hereinafter referred to as a "front focus position" and a "rear focus position"). That is, a total of three frames of partial images are obtained. The depth of focus is obtained from the position of the focusing lens and aperture value at the time of full shutter press. The amount of deviation d is previously obtained for each depth of focus and summarized in a table stored in a ROM (not shown) in the camera control CPU 20. From this table, the amount of deviation d corresponding to the depth of focus is obtained for use.

Then, AF evaluation values (contrast) for the three partial image data are obtained and compared with each other. From comparison, the partial image with a maximum AF evaluation value is taken as the image in sharpest focus and a corresponding position of the focusing lens is selected.

Hereinafter, the internal operation when the shutter button 24*a* is fully pressed in the state S4 will be discussed. At a full shutter press of the shutter button 24*a*, the diaphragm 5 is set to a predetermined aperture value with the focusing lens held at the position when driven by the phase difference AF at the time of half shutter press, and upward rotatable displacement of the quick return mirror M1 about the pivot 6 starts as indicated by an open arrow in FIG. 2B. In response to this, the imaging unit 19 is moved forward by the movement mechanism 30 in the direction of the optical axis of the taking lens portion 4. In FIGS. 2A to 2D, the actuator 17 for driving the quick return mirror M1 and the movement mechanism 30 for moving the imaging unit 19 are not shown.

When the quick return mirror M1 reaches a portion adjacent to the focusing screen 10, as shown in FIG. 2C, to complete its mirror-up operation, the forward movement of the imaging unit 19 comes to a stop and the image receiving plane of the image sensor 8 is placed in the position of back focal length. Then, as shown in FIG. 2D, the focal plane shutter 7 opens and closes at a predetermined speed, whereby the optical image passing through the taking lens portion 4 and the diaphragm 5 is directly formed on the image sensor 8 and photoelectrically converted therein. Under timing control of the camera control CPU 20, only a partial image signal in the AF area out of the photoelectrically converted signal is outputted through the buffer.

Then, the depth of focus at the time of full shutter press is obtained in the same manner as above described and the corresponding amount of deviation d of the focusing lens is obtained. According to those values, the focusing lens is moved to its front and rear focus positions at each of which a partial image is captured as above described. Then, the position of the focusing lens which provides the partial image in sharpest focus is selected as above described and the focusing lens is actually moved to the selected position.

Next, an image capture operation is performed at the selected position of the focusing lens (state S5). More specifically, as shown in FIG. 2D, the focal plane shutter 7 opens and closes at a predetermined speed, whereby the optical image passing through the taking lens portion 4 and the diaphragm 5 is directly formed on the image sensor 8 and photoelectrically converted therein. The photoelectrically converted signal is then outputted through the buffer.

The image data outputted from the image sensor 8 is subjected to predetermined signal processing in the CDS circuit 81, the AGC circuit 82, and the A/D converter 83, fetched into the image processor 40, and written into the image memory 61 in synchronization with readout of the image sensor 8.

After the image capture, the quick return mirror M1 is rotated back to its original position, whereby the optical path L again goes toward the focusing screen 10 and the digital camera 1 is placed in the shooting standby state. In response to the rotational return movement of the quick return mirror M1, the imaging unit 19 moves backward to its retracted position in the direction of the optical axis to avoid interference with the rotational movement of the quick return mirror M1.

Next, selected image data are recorded on the memory card 62. More specifically, the image data written into the image memory 61 are subjected to the aforementioned processing such as pixel interpolation, color balance control, and gamma correction in the image processor 40 and are stored again in the image memory 61. Resultant image data are fetched from the image memory 61 and displayed as a captured image on the display unit 16. Simultaneously, these image data are also subjected to image compression in the image compression block 45 and recorded on the memory card 62 through the memory card driver 46.

At the completion of the image capture operation, the digital camera 1 returns to the state S1.

If the LCD button 31 is pressed in the state S1, the display unit 16 is turned on and the digital camera 1 goes into the capture mode with live view display. As shown in FIG. 2D, the quick return mirror M1 is flipped up, the display unit 16 is turned on to start a live view display, and the contrast AF is performed (state S6).

In the state S6, the quick return mirror M1 in the up position allows light from the taking lens portion 4 to reach the image sensor 8. Thereby, image data outputted from the image sensor 8 for each predetermined period of time (e.g., at every $\frac{1}{30}$th second) are stored in the image memory 61 through the image processor 40. The image data are then read out by the image processor 40 for the aforementioned image processing and stored again in the image memory 61. The video encoder 44 reads out the above data stored in the image memory 61 and encodes them to the NTSC/PAL format, the result of which is displayed on the display unit 16 and produces a live view display.

The camera control CPU 20 performs the contrast AF even for the live view display. Here, the contrast AF method is an autofocus method for achieving focus by fetching image data from the image memory 61 to obtain an AF evaluation value (contrast) for the image and driving the focus motor 36 to move the focusing lens to the position with the maximum AF evaluation value. At this time, a known technique such as a "hill-climbing" method or the like can be adopted as a control method for achieving maximum contrast.

At a subsequent half shutter press of the shutter button 24*a*, in which case the conditions are almost identical to those in the state S6, exposure adjustments and more precise contrast AF are performed (state S7). The exposure adjustment at this time is accomplished by adjusting the diaphragm 5 through the diaphragm driver 21 and adjusting the amount of light exposure in the image sensor 8, i.e., charge storage time in the image sensor 8 corresponding to the shutter speed. The contrast AF performs focusing with higher accuracy by dividing the step of moving the focusing lens into smaller segments than in the state S6. This provides more precise framing.

At a subsequent full shutter press of the shutter button 24*a*, an image capture operation is performed based on the contrast AF (state S8). In the image capture operation, as above described, the focal plane shutter 7 opens and closes at a predetermined speed, whereby the optical image from the taking lens portion 4 is directly formed on the image sensor 8 and resultant image data are stored in the image memory 61. These image data are fetched into the image processor 40 for the aforementioned image processing and stored again in the image memory 61. The image data are also recorded on the memory card 62.

At the completion of the image capture operation, the digital camera 1 returns again to the state S6 and is enabled for next image capture.

If the LCD button 31 is pressed in the state S6, the display unit 16 and accordingly the live view display are turned off and the digital camera 1 goes into the capture mode with the optical viewfinder in the aforementioned state S1.

The above description has provided the state transitions and operations of the digital camera 1.

According to this preferred embodiment as has been described, a single lens reflex digital camera performs the contrast AF for live view display while withdrawing the quick return mirror M1 from the imaging optical system comprised of the taking lens portion 4, the diaphragm 5, and the imaging unit 19. The contrast AF can thus be performed responsive to the live view display. Further, the contrast AF for live view display provides precise framing.

With the live view display off, the phase difference AF is performed with the quick return mirror M1 placed in the imaging optical system to allow visual recognition of the subject image in the optical viewfinder. Thus, a user can intentionally switch between the live view display and the optical viewfinder, which permits autofocusing even for framing using the optical viewfinder.

When the live view display is off, the display unit 16 is turned off. This reduces power consumption.

In the capture mode with the optical viewfinder, the phase difference AF is performed at the half shutter press of the shutter button 24a (state S3). This shortens processing time for autofocusing at the time of half shutter press, thereby preventing the occurrence of a time lag due to autofocusing.

When the contrast AF is selected on the menu setting screen, the quick return mirror M1 is withdrawn from the imaging optical system (state S6), while when the phase difference AF is selected on the menu setting screen, the quick return mirror M1 is placed inside the imaging optical system (state S1 ). From this, the contrast AF can be performed when high focusing precision is required and the phase difference AF when high-speed autofocusing is required. That is, a most suitable autofocusing method can be selected at a user's discretion.

When the contrast AF method is selected on the menu setting screen, the live view display is turned on. This provides precise framing based on live view images based on the contrast AF.

When the display unit 16 is off, the quick return mirror M1 is located inside the imaging optical system and the phase difference AF method is correspondingly selected. This permits framing even during the off state of the live view display.

After actual image recording, at least a display on the display unit 16 is restored to either the on or off state of the live view display immediately before the actual image recording. This enhances the operability of the digital camera.

Further, the contrast AF performed at the time of actual image recording (full shutter press) achieves precise focus in the actual image recording.

In the capture mode with the optical viewfinder, the phase difference AF is performed at the time of half shutter press and the contrast AF at the time of full shutter press. That is, the contrast AF can be performed at the time of full shutter press that requires high-precision autofocusing.

2. Second Preferred Embodiment

Next, a second preferred embodiment of the present invention will be set forth. A digital camera 1 according to the second preferred embodiment is basically identical to that of the aforementioned first preferred embodiment. The following description will thus be made mainly in parts that differ from the first preferred embodiment.

Figure 7:
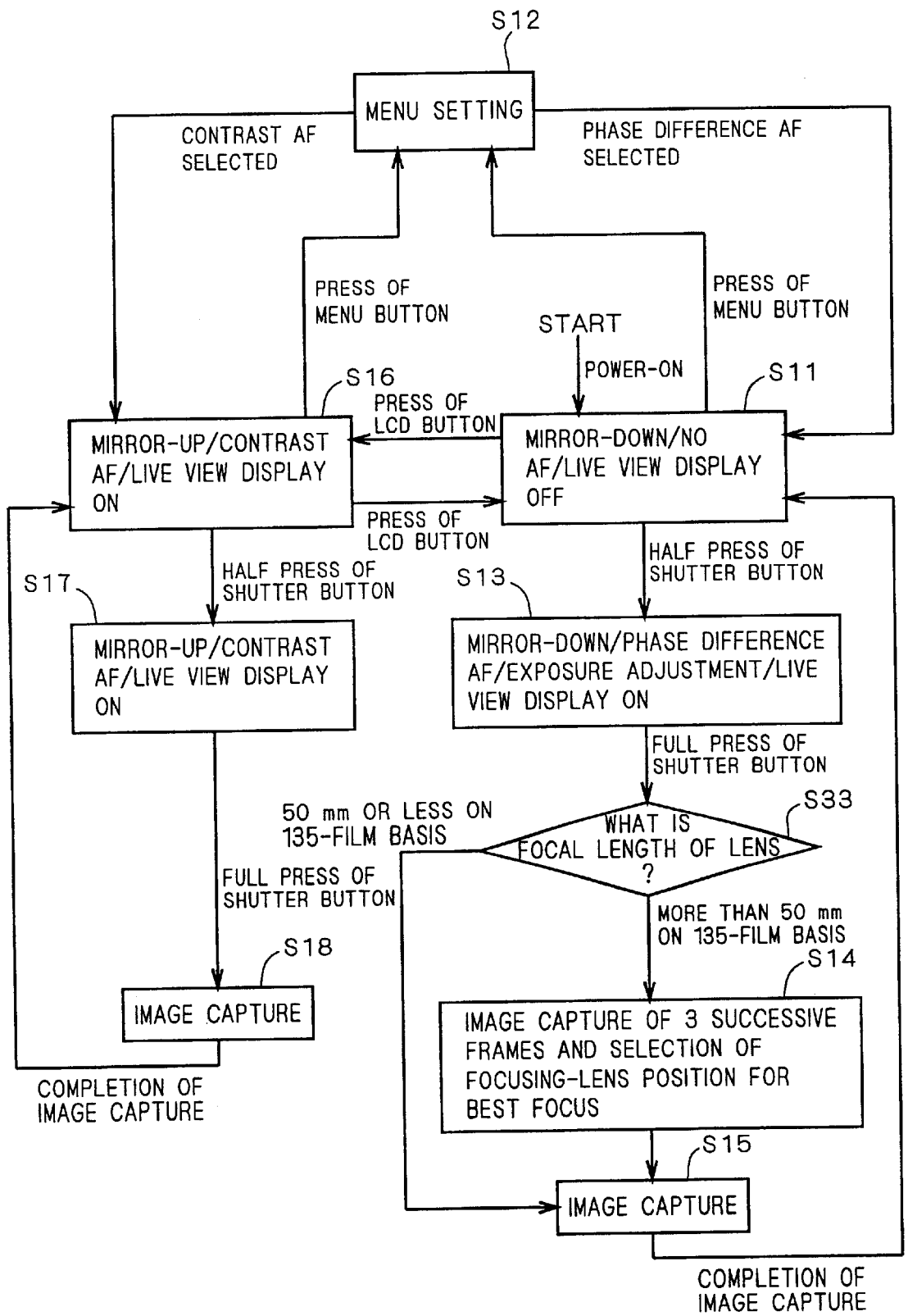
FIG. 7 is a state transition diagram when a digital camera according to a second preferred embodiment is in capture mode.

FIG. 7 is a state transition diagram of the digital camera 1 in the capture mode according to the second preferred embodiment. Hereinafter, the state transitions in the capture mode will be set forth in detail. Unless otherwise specified, the operation of each unit is controlled by the camera control CPU 20 (cf. FIG. 3).

At power-on, the digital camera 1 goes into the capture mode with the optical viewfinder, in which mode the digital camera 1 starts to operate with the quick return mirror M1 in the down position as shown in FIG. 2A, the display unit 16 off, and accordingly the live view display described later in the off state (state S11). In this state, AF processing is not performed. Thus, a subject image in the optical viewfinder is slightly out of focus, however, rough framing by the optical viewfinder is possible in this state.

In the state S11 and a state S16 which will be described later, a menu setting screen appears on the display with a user's press of the menu button 34, on which screen a user makes menu settings (state S12).

As previously described, FIG. 4 shows the menu setting screen displayed on the screen of the display unit 16. As shown in FIG. 4, the menu setting screen allows a user to selectively define an AF method to be applied at a half shutter press of the shutter button 24a. By pressing either the button U or D of the 4-way switch 35, a selection of the AF method at the half shutter press is made from the contrast AF method and the phase difference AF method.

If the phase difference AF method is selected in the state S12, a transition to the state S11 occurs, while if the contrast AF method is selected in the state S12, a transition to the state S16 occurs. At this time, the transition from the states S12 to S11 turns off the display unit 16 (i.e., live view display), while the transition from the states S12 to S16 holds the display unit 16 in the on state and turns on the live view display.

When the shutter button 24a is pressed halfway down in the state S11, phase difference AF and exposure adjustments are performed with the quick return mirror M1 in the down position and the live view display off (state S13). Hereinafter, the operation in state S13 will be set forth in detail.

At the half shutter press of the shutter button 24a, as shown in FIG. 2A, the optical path L of light incident from the taking lens portion 4 and the diaphragm 5 changes its direction upward because of the presence of the quick return mirror M1 in the camera body 2. An image is then formed on the focusing screen 10, inverted and scaled down by the pentagonal prism 11, and received by the light measuring sensor 14. The light measuring sensor 14 measures the amount of light, from which the camera control CPU 20 obtains exposure control data. According to the exposure control data, the diaphragm 5 is controlled through the diaphragm driver 21 and the timing generator 22 for applying the drive control signal to the image sensor 8 is controlled, so that the image sensor 8 receives a proper amount of light exposure.

At this time, the imaging unit 19 is in its retracted position to avoid mechanical interference with the quick return mirror M1, and the image receiving plane of the image sensor 8 is located behind the position of back focal length.

Part of the light incident from the taking lens portion 4 and the diaphragm 5 passes through a half mirror portion in the center of the quick return mirror M1 and travels through the mirror M2 and the fixed mirror M3 toward the distance-measuring sensor 15. Upon receipt of the light, the distance-measuring sensor 15 detects a distance to the subject to generate a phase difference detection signal. According to this phase difference detection signal, the camera control CPU 20 drives the focusing lens in the taking lens portion 4 for autofocusing.

Simultaneously with the aforementioned light and distance measuring operations, the optical image, the optical path L of which changed direction at the quick return mirror M1, is scaled down by the prism 11 and the relay lens 12 and then reaches the eyepiece 13. From this, a user can visually recognize a focused subject image through the eyepiece 13. Although not shown, a user can go back to the state S11 for reframing at the release of the half-pressed shutter button 24*a* during the state S13, which provides precise framing.

If the shutter button 24*a* is further pressed to its full-pressed position by a user and the focal length of the taking lens 3 (which may be a zoom lens) is 50 mm or less on a 135-mm film basis in a state S33, an image capture operation is performed in a state S15. If the focal length is longer than 50 mm, on the other hand, image capture of three successive frames is performed in a predetermined AF area and a position of the focusing lens is selected which provides the image in sharpest focus out of the three partial images obtained (state S14). That is, when the taking lens 3 is a lens for use in telephotography, a lens drive is first conducted based on the phase difference detection signal and then another lens drive is conducted based on the AF evaluation value according to the contrast AF method.

Hereinafter, the operation in the state S14 will be set forth in detail.

As shown in FIG. 6, for image capture of three successive frames, the image sensor 8 obtains partial image data about only the AF area of central partial rectangular area of the image at different positions of the focusing lens: a position at the time of full shutter press (i.e., an in-focus position determined by the phase difference AF) and positions determined by shifting the above in-focus position both forward and backward by the amount of deviation d obtained from the depth of focus (hereinafter referred to as a "front focus position" and a "rear focus position"). That is, a total of three frames of partial images are obtained. The depth of focus is obtained from the position of the focusing lens and aperture value at the time of full shutter press. The amount of deviation d is previously obtained for each depth of focus and summarized in a table stored in a ROM (not shown) in the camera control CPU 20. From this table, the amount of deviation d corresponding to the depth of focus is obtained for use.

Then, AF evaluation values (contrast) for the three partial image data are obtained and compared with each other. From comparison, the partial image with a maximum AF evaluation value is taken as the image in sharpest focus and a corresponding position of the focusing lens is selected.

Hereinafter, the internal operation when the shutter button 24*a* is fully pressed in the state S14 will be discussed. At a full shutter press of the shutter button 24*a*, the diaphragm 5 is set to a predetermined aperture value with the focusing lens held at the position when driven by the phase difference AF at the time of half shutter press, and upward rotatable displacement of the quick return mirror M1 about the pivot 6 starts as indicated by the open arrow in FIG. 2B. In response to this, the imaging unit 19 is moved forward by the movement mechanism 30 in the direction of the optical axis of the taking lens portion 4. In FIGS. 2A to 2D, the actuator 17 for driving the quick return mirror M1 and the movement mechanism 30 for moving the imaging unit 19 are not shown.

When the quick return mirror M1 reaches under the focusing screen 10 as shown in FIG. 2C to complete its mirror-up operation, the forward movement of the imaging unit 19 comes to a stop and the image receiving plane of the image sensor 8 is placed in the position of back focal length. Then, as shown in FIG. 2D, the focal plane shutter 7 opens and closes at a predetermined speed, whereby the optical image passing through the taking lens portion 4 and the diaphragm 5 is directly formed on the image sensor 8 and photoelectrically converted therein. Under timing control of the camera control CPU 20, only a partial image signal in the AF area out of the photoelectrically converted signals is outputted through the buffer.

Then, the depth of focus at the time of full shutter press is obtained in the same manner as above described and the corresponding amount of deviation d of the focusing lens is obtained. According to those values, the focusing lens is moved to its front and rear focus positions at each of which a partial image is captured as above described. Then, the position of the focusing lens which provides the partial image in sharpest focus is selected as above described and the focusing lens is actually moved to the selected position.

Next, an image capture operation is performed at the selected position of the focusing lens (state S15). More specifically, as shown in FIG. 2D, the focal plane shutter 7 opens and closes at a predetermined speed, whereby the optical image passing through the taking lens portion 4 and the diaphragm 5 is directly formed on the image sensor 8 and photoelectrically converted therein. The photoelectrically converted signal is then outputted through the buffer.

The image data outputted from the image sensor 8 are subjected to predetermined signal processing in the CDS circuit 81, the AGC circuit 82, and the A/D converter 83, fetched into the image processor 41, and written into the image memory 61 in synchronization with readout of the image sensor 8.

After the image capture, the quick return mirror M1 is rotated back to its original position, whereby the optical path L again goes toward the focusing screen 10 and the digital camera 1 is placed in the shooting standby state. In response to the rotational return movement of the quick return mirror M1, the imaging unit 19 moves backward to its retracted position in the direction of the optical axis to avoid interference with the rotational movement of the quick return mirror M1.

Next, selected image data are recorded on the memory card 62. More specifically, the image data written into the image memory 61 are subjected to the aforementioned processing such as pixel interpolation, color balance control, and gamma correction in the image processor 40 and are stored again in the image memory 61. Resultant image data are fetched from the image memory 61 and displayed as a captured image on the display unit 16. Simultaneously, these image data are also subjected to image compression in the image compression block 45 and recorded on the memory card 62 through the memory card driver 46.

At the completion of the image capture operation, the digital camera 1 returns to the state S11.

When the LCD button 31 is pressed in the state S11, the display unit 16 is turned on and the digital camera 1 goes into the capture mode with live view display. As depicted in FIG. 2D, the quick return mirror M1 is flipped up, the display unit 16 is turned on to start a live view display, and the contrast AF is performed (state S16).

In the state S16, the quick return mirror M1 in the up position allows light from the taking lens portion 4 to reach the image sensor 8. Thereby, image data outputted from the image sensor 8 for each predetermined period of time (e.g., at every 1/30th second) are stored in the image memory 61 through the image processor 40. The image data is then read out by the image processor 40 for the aforementioned image processing and stored again in the image memory 61. The video encoder 44 reads out the above data stored in the image memory 61 and encodes them to the NTSC/PAL format, the result of which is displayed on the display unit 16 and produces a live view display.

The camera control CPU 20 performs the contrast AF even for the live view display. Here, the contrast AF method is an autofocus method for achieving focus by fetching image data from the image memory 61 to obtain an AF evaluation value (contrast) for the image and driving the focus motor 36 to move the focusing lens to the position with the maximum AF evaluation value. At this time, a known technique such as a "hill-climbing" method or the like can be adopted as a control method for achieving maximum contrast.

At a subsequent half shutter press of the shutter button 24a, in which case the conditions are almost identical to those as in the state S16, exposure adjustments and more precise contrast AF are performed (state S17). The exposure adjustment at this time is accomplished by adjusting the diaphragm 5 through the diaphragm driver 21 and adjusting the amount of light exposure in the image sensor 8, i.e., charge storage time in the image sensor 8 corresponding to the shutter speed. The contrast AF performs focusing with higher accuracy by dividing the step of moving the focusing lens into smaller segments than in the state S16. This provides precise framing.

At a subsequent full shutter press of the shutter button 24a, an image capture operation is performed based on the contrast AF (state S18). In the image capture operation, as above described, the focal plane shutter 7 opens and closes at a predetermined speed, whereby the optical image from the taking lens portion 4 is directly formed on the image sensor 8 and resultant image data are stored in the image memory 61. These image data are fetched into the image processor 40 for the aforementioned image processing and stored again in the image memory 61. The image data are also recorded on the memory card 62.

At the completion of the image capture operation, the digital camera 1 returns again to the state S16 and is enabled for next image capture.

If the LCD button 31 is pressed in the state S16, the display unit 16 and accordingly the live view display are turned off and the digital camera 1 goes into the capture mode with the optical viewfinder in the aforementioned state S11.

The above description has provided the state transitions and operations of the digital camera 1.

According to this preferred embodiment as has been described, a single lens reflex digital camera is configured to first conduct a lens drive based on the phase difference detection signal according to the phase difference AF method and then conduct another lens drive based on the evaluation value according to the contrast AF method. Thus, a rough in-focus condition can be achieved in a short time by the phase difference AF method and a more precise in-focus condition can be achieved by the contrast AF method. The digital camera 1 of this preferred embodiment can thus achieve an in-focus condition with great accuracy and efficiency.

The digital camera 1 is also configured to conduct a lens drive based on the AF evaluation value after the completion of the exposure control. That is, the taking lens can be driven on the basis of the evaluation value which is obtained under the same conditions as actual image recording. This achieves a more precise in-focus condition.

In parallel with the exposure control, the digital camera 1 conducts a lens drive based on the phase difference detection signal. This permits an efficient operation of the digital camera 1 and especially an efficient lens drive.

Further, when the taking lens is a lens for use in telephotography, the digital camera 1 first conducts a lens drive based on the phase difference detection signal and then conducts another lens drive based on the AF evaluation value. This achieves an in-focus condition with efficiency.

3. Modifications

While several examples of the digital camera 1 have been given in the aforementioned preferred embodiments, it is to be understood that the present invention is not limited thereto.

For example, in the aforementioned preferred embodiments, when the shutter button is fully pressed in the capture mode with the optical viewfinder, image capture of three successive frames is performed to achieve the best in-focus condition for image capture. Instead, only a single frame of image may be captured as usual by a normal contrast AF method such as a "hill-climbing" method.

While the invention has been shown and described in detail, the foregoing description is in all aspects illustrative and not restrictive. It is therefore understood that numerous modifications and variations can be devised without departing from the scope of the invention.

What is claimed is:

1. A digital camera comprising:
    an image sensor for capturing a subject image;
    a mirror movable between a first position, in an optical path from an imaging optical system to said image sensor, and a second position, withdrawn from said optical path;
    a driver for driving said mirror;
    a first detector for detecting an in-focus condition of said imaging optical system on the basis of an image signal from said image sensor;
    a display for displaying an image signal obtained from said image sensor; and
    a focus controller for, when said display provides a display, controlling said driver to move said mirror to said second position and driving said imaging optical system according to a result of detection by said first detector.

2. A digital camera according to claim 1, wherein said display displays a live view image.

3. A digital camera according to claim 1, further comprising:

a second detector for detecting an in-focus condition of said imaging optical system by a phase difference method;

an operating member for display to turn off said display; and a display controller for turning off said display upon operation of said operating member for display, wherein when said display controller turns off said display, said focus controller places said mirror at said first position and drives said imaging optical system according to a result of detection by said second detector.

4. A digital camera according to claim 3, further comprising:

an operating member for image capture being movable between a first operating position and a second operating position which is a further pressed position from said first operating position, wherein when said operating member for image capture is at said first operating position, said focus controller drives said imaging optical system according to a result of detection by said second detector.

5. A digital camera according to claim 1, further comprising:

an optical viewfinder for allowing visual recognition of a subject when said mirror is at said first position.

6. A digital camera comprising:

an image sensor for capturing a subject image;

a mirror movable between a first position, in an optical path from an imaging optical system to said image sensor, and a second position, withdrawn from said optical path;

a driver for driving said mirror;

a first detector for detecting an in-focus condition of said imaging optical system on the basis of an image signal from said image sensor;

a second detector for detecting an in-focus condition of said imaging optical system by a phase difference method;

a selector for selecting either said first detector or said second detector; and a driver controller for, when said selector selects said first detector to detect an in-focus condition, controlling said driver to move said mirror to said second position and, when said selector selects said second detector to detect an in-focus condition, placing said mirror at said first position.

7. A digital camera according to claim 6, further comprising:

a display capable of displaying a live view image; and a display controller for turning on said display when said selector selects said first detector to detect an in-focus condition.

8. A digital camera according to claim 7, wherein when said display is turned off, said driver controller places said mirror at said first position.

9. A digital camera according to claim 8, wherein after actual image recording, said display controller restores a condition of said display to a condition immediately before said actual image recording.

10. A digital camera according to claim 6, further comprising:

an optical viewfinder for allowing visual recognition of a subject when said mirror is at said first position.

11. A digital camera comprising:

an image sensor for capturing a subject image;

a mirror movable between a first position, in an optical path from an imaging optical system to said image sensor, and a second position, withdrawn from said optical path;

a driver for driving said mirror;

a first detector for detecting an in-focus condition of said imaging optical system on the basis of an image signal from said image sensor;

a second detector for detecting an in-focus condition of said imaging optical system by a phase difference method;

an operating member for image capture being movable from a first operating position to a second operating position which is a further pressed position from said first operating position; and a focus controller for, when said operating member for image capture is at said first operating position, placing said mirror at said first position and driving said imaging optical system according to a result of detection by said second detector and, when said operating member for image capture is at said second operating position, controlling said driver to move said mirror to said second position and driving said imaging optical system according to a result of detection by said first detector.

12. A digital camera according to claim 11, further comprising:

an optical viewfinder for allowing visual recognition of a subject when said mirror is at said first position.

13. A digital camera comprising:

an image sensor for capturing a subject image;

a mirror movable between a first position, in an optical path from an imaging optical system to said image sensor, and a second position, withdrawn from said optical path;

a driver for driving said mirror;

a first detector for detecting an in-focus condition of said imaging optical system on the basis of an image signal from said image sensor;

a second detector for detecting an in-focus condition of said imaging optical system by a phase difference method; and a focus controller for, after driving said imaging optical system according to a result of detection by said second detector with said mirror located at said first position, then controlling said driver to move said mirror to said second position and driving said imaging optical system according to a result of detection by said first detector.

14. A digital camera according to claim 13, further comprising:

an exposure controller for performing a predetermined computation of exposure to obtain a proper exposure value for image capture and exercising exposure control over said image sensor on the basis of said proper exposure value, wherein said focus controller drives said imaging optical system according to a result of detection by said first detector after completion of the exposure control by said exposure controller.

15. A digital camera according to claim 14, wherein said focus controller controls a drive of said imaging optical system, according to a result of detection by said second detector, in parallel with the exposure control by said exposure controller.

16. A digital camera according to claim 13, wherein, when a focal length of said imaging optical system is not less than a predetermined value, said focus controller drives said imaging optical system according to a result of detection by said second detector and then drives said imaging optical system according to a result of detection by said first detector.

* * * * *